UNITED STATES PATENT OFFICE

NARCISSE PIGEON, OF BROOKLYN, NEW YORK.

IMPROVEMENT IN THE MANUFACTURE OF STARCH SUGAR.

Specification forming part of Letters Patent No. 64,139, dated April 23, 1867; reissue No. 3,201, dated November 17, 1868.

Be it known that I, NARCISSE PIGEON, formerly of Montreal, Canada, and now resident in Brooklyn, New York, have invented a new and useful Process in the Manufacture of Sirup and Sugar from cereals or other substances having the chemical formula $C^{12} H^{10} O^{10}$; and I do hereby declare that the following is a full, clear, and exact description thereof, which will enable others skilled in the art to practice and use my invention, reference being had to the accompanying drawings, forming part of this specification, in which—

Figure 1 is a vertical section of the apparatus in which the heat is applied. Fig. 2 is a top view of the same.

Similar letters of reference indicate like parts.

My invention consists in a new process of making a highly pure sirup and a crystallizable sugar-sirup, and in making it from substances, whether extracted from Indian corn or any other vegetable product having the above-stated chemical formula; and it also consists in a process of making a hard crystallized sugar from such sirup.

I assume starch and cellulose, in a nearly solid state, as the ordinary substance from which I propose to make my pure sirup and my crystallizable sugar-sirup; and in order to explain my new method of manufacture, I first state herein the steps of the process, and will then repeat those steps, in connection with the working directions as to the proportions of materials and the use of the apparatus to be employed.

First. For the extraction and preparation of the substances to be saccharified I employ for grain the usual and well-known method of making starch, taking care to obtain as much cellulose as possible, substantially in the manner hereinafter described. In this respect my process is distinguishable from all former methods of making sugar-sirup from grains. I not only employ that part of the grains which is starch, but also other parts, and principally the woody fibers of the grains themselves.

Second. Having obtained the coarse starch and cellulose, I mix them with warm water, slightly acidulated with sulphuric acid or tartaric acid, in the manner hereinafter described. The difference, in this respect, between other processes and mine is that in mine the conversion into sugar is so easy that it hardly requires any acid, thus facilitating the crystallization.

Third. The mixture above described I put into boiling water, and after hermetically closing the boiling vessel I boil it under a high heat and a great pressure, in the manner hereinafter described. The object and effect of boiling at a degree not less than 325° Fahrenheit are to convert the dextrine totally or nearly into crystallizable sugar, as dextrine is an obstacle to crystallization. The boiling under that great heat also converts the cellulose into sugar.

Fourth. Having obtained a sweet liquor, free from dextrine, or nearly so, I draw it off from the boiling vessel and saturate it with whiting, which is the first neutralization. The liquor is then filtered through bag-filters, and it is submitted to the action of well-purified fine bone-black in the boiling vessel. The liquor is concentrated to 20° or 22° Baumé, and allowed to stand in a receiver for the precipitation of the sulphate of lime or other impurities, at a heat not less than 120° Fahrenheit. It is then filtered through animal charcoal or bone-black, and neutralized again at the same time by pure hydrate of soda. The hydrate of soda being used on the top of the charcoal, and the liquor not being boiled with the alkaline matter, no glucic or melassic acid is created. The neutralization is perfect, and no foreign substances will remain in the liquor to impair crystallization. The liquor is boiled in the vacuum-pan to 36° or 38° Baumé. The sirup may be worked into crystallized sugar by being put into molds and drained. The sugar will then resemble, in some respects, Manilla sugar, and may be made into refined sugar in the same manner.

I will now state the working-rules of the several steps of my process, and the method of using the apparatus I employ for boiling.

First. The substances to be saccharified are generally extracted from corn, or other vegetable product, in the modern and well-known method, using, in steeping, a weak solution of caustic soda. The purification of the matter is effected by washing it upon inclined tables, as practiced in starch factories. The gluten and lighter matter are carried off and let fall into a wooden vessel. The gluten, after being washed, may be used for making a cheap but nutritious bread. The fecula and cellulose from the tables are washed first with alkaline water, and then several times with pure water. They are then treated with hydrochloric acid. About one per cent. of such acid is mixed with the amylaceous substance, which, if in a dry state, has been diluted in less than its own weight of water. After standing twenty-four hours the matter is washed with pure water. The fecula and cellulose are treated with hydrochloric acid to decompose the salts, oils, azotized matter, &c., as being the best solvent. The matter thus treated is put into oblong boxes, where it is allowed to drain, and to become nearly a solid mass. So far as I know my process differs from others, as I employ an alkali and an acid alternately. What one substance will not decompose the other will. I am aware that others have applied an alkali alone, or an acid alone.

Second. For forming the mixture that is to be introduced into the boiling-vessel I put two hundred pounds of the convertible matter into three hundred and twenty pounds of water, at a temperature of 120° Fahrenheit, with one per cent. of sulphuric acid—that is, with two pounds of the acid to every two hundred pounds of the matter. But as it is desirable, and in my method practicable, to diminish the quantity of acid, and, in fact, to do away with it entirely, I give the following rule, namely: That the acid may be one per cent. in weight of the substances to be converted, when the boiling, hereinafter described, is to be at 212° or 215° Fahrenheit, and the acid may be diminished in quantity as the heat in the boiling-vessel is increased until, when the mixture is to be boiled at 325° Fahrenheit, or upward, no acid need be used.

Third. The apparatus which I use as a boiling-vessel I describe as follows, referring to the drawing hereto annexed:

A is a strong iron boiler or vessel, made in three sections, each two feet high and five feet wide. It is convex at each end, and every part of its interior is lined with lead, or the vessel itself may be enameled. Every cock, tube, &c., in communication with the inside of the apparatus should be made of copper, brass, or lead. B is a strong lead pipe, open at its lower end, and passing down through the apparatus, and bent near its lower end, as shown in the drawing, to introduce the steam. The iron part, or outside shell, of the apparatus is perforated with small holes to allow the air to escape. A safety-valve, a steam-gage, and a sugar-pan thermometer should be attached to the upper end or head of the apparatus. About forty gallons of water are placed in the apparatus A and raised to a boiling-heat by means of steam. Into this boiling-vessel I convey the mixture, prepared as above described, either with or without acid, according to the intended application of the heat in the boiling-vessel, in the following manner: A quantity of this mixture, containing two hundred pounds of the convertible matter, is conveyed into the boiling water in the apparatus A in an uninterrupted stream, the whole being always kept at the boiling-point. A like quantity is then prepared and introduced, and so on successively until a thousand pounds of the convertible matter have been conveyed into the boiling water. The appatus A is then closed hermetically, and the heat of its contents is gradually raised, according to the desired result, and a pressure is kept on, generally from fifty to ninety-five pounds' pressure, or more, to the square inch, for thirty minutes, or less, according to the desired quality of the sugar, five minutes being sufficient for certain kinds of sugar. By thus boiling under a great heat and pressure, the convertible matter is first converted into dextrine, and the dextrine is converted totally or nearly into sugar. When the greatest heat and pressure are on the apparatus the cellulose is also converted into sugar. Dextrine is an obstacle to crystallization, and ordinary heat will never convert it into sugar. When the conversion of the matter is completed the steam is turned off, and the liquor is drawn out.

Fourth. The saturation is effected by employing twice as much whiting as there was acid used. The sweet liquor is filtered through bags, and for crystallization it is treated with about forty pounds of well-purified fine bone-black, and submitted again to the great heat. It is filtered again, and evaporated in an ordinary evaporator, such as is used for evaporating cane-juice. The sediment from the bags is well pressed. The liquor is concentrated to 20° to 22° Baume, and is allowed to stand in a receiver for the precipitation of the sulphate of lime or other impurities. The liquor is then filtered through bone-black, and treated at the same time with hydrate of soda, this being the second neutralization, which neutralization must be perfect, as any trace of acid impairs crystallization.

The clear sirup, perfectly neutral, free from salts or other impurities, is now boiled in the vacuum-pan at 36° or 37° Baumé for crystallization. To obtain it concrete, or in an amorphous solid mass, it is evaporated at 45°, cold. It must always be remembered that, to make this kind of sugar crystallizable, it must contain no dextrine, or nearly none; must be defecated, filtered through bags and bone-black, free from every kind of acid, also from sulphate of lime, or other salts, and worked in the same mannner as raw cane-sugar would be—*i. e.*, put in molds, clayed, drained, &c., with the exception of boiling it less in the vacuum-pan.

The temperature of the rooms where the crystallization is to take place should be about 75° Fahrenheit.

I do not limit myself to the use of the prewith the exception of boiling it less in the vacuum-pan.

The temperature of the rooms where the crystallization is to take place should be about 75° Fahrenheit.

I do not limit myself to the use of the precise apparatus for boiling herein described, because an important and characteristic feature of my process consists in boiling the convertible matter with a small quantity of acid or without any under great heat and pressure, in order to convert the whole dextrine and cellulose into crystallizable sugar, and this can be done in any apparatus in which boiling can be applied to the convertible matter, substantially in the manner and for the purpose above described.

What I claim as new, and desire to secure by Letters Patent, is—

1. The within-described process of manufacturing a pure sirup and crystallizable sugar-sirups from prepared fecula, cellulose, or other similar matter, by freeing it from salts, empyreumatic oils, &c., substantially as described, and by treating the matter so as to convert the whole dextrine, cellulose, &c., into crystallizable sugar sirup, substantially in the manner above described.

2. The within-described process of manufacturing a hard crystallized sugar from fecula or other similar substances, substantially as herein set forth.

3. The above-described part of my process, which consists in freeing the sirup of any acid by the double neutralization, substantially in the manner above described.

NARCISSE PIGEON.

Witnesses:

GEO. T. CURTIS,

JAMES H. FAY.